(12) United States Patent
Sonnenberg et al.

(10) Patent No.: US 12,159,018 B2
(45) Date of Patent: Dec. 3, 2024

(54) SEARCH SYSTEM, MEDIA, AND METHOD FOR PROVIDING COMMUNICATIONS-BASED COMPATIBILITY FEATURES

(71) Applicant: eBay Inc., San Jose, CA (US)

(72) Inventors: Alexander Binyamin Sagiv Sonnenberg, Hadera (IL); Ido Guy, Haifa (IL); Viatcheslav Novgorodov, Rishon LeZion (IL)

(73) Assignee: eBay Inc., San Jose, CA (US)

( * ) Notice: Subject to any disclaimer, the term of this patent is extended or adjusted under 35 U.S.C. 154(b) by 856 days.

(21) Appl. No.: 16/682,306

(22) Filed: Nov. 13, 2019

(65) Prior Publication Data

US 2021/0141850 A1    May 13, 2021

(51) Int. Cl.
*G06Q 30/00*    (2023.01)
*G06F 3/0482*    (2013.01)
(Continued)

(52) U.S. Cl.
CPC ........ *G06F 3/0482* (2013.01); *G06F 16/9538* (2019.01); *G06Q 30/0627* (2013.01);
(Continued)

(58) Field of Classification Search
USPC .......................................... 707/722
See application file for complete search history.

(56) References Cited

U.S. PATENT DOCUMENTS 7,620,651 B2 * 11/2009 Chea ................. G06Q 30/0203
707/999.005
7,813,965 B1   10/2010 Robinson et al.
(Continued)

OTHER PUBLICATIONS

Rossetti, M., Stella, F., Zanker, M., Analyzing user reviews in tourism with topic models, 2016, Information Technology & Tourism (2016) 16:5-21, pp. 5-21 (Year: 216).*

(Continued)

*Primary Examiner* — Jeffrey A. Smith
*Assistant Examiner* — Brittany E Bargeon
(74) *Attorney, Agent, or Firm* — Shook, Hardy & Bacon L.L.P.

(57) ABSTRACT

Methods, systems, and computer storage media for providing supplementary item information on communications-based compatibility features for a primary item in an item listing platform. In particular, communications-based compatibility features are extracted from user communications about the primary item to identify additional features of the item. In operation, a supplementation engine of an item listing platform, accesses user communications for the primary item. Supplementary item information is generated for the item, where the supplementary item information includes a communications-based compatibility feature associated with the item. The communications-based compatibility feature indicates that the primary item is compatible with the secondary item, a non-standard feature (e.g., a feature not provided in a feature set of the primary item), or a demographic feature (e.g., age). The supplementary item information is provided to cause presentation of a user interface element corresponding to the communications-based compatibility feature on a user interface of the item listing platform.

20 Claims, 11 Drawing Sheets

(51) Int. Cl.
*G06F 16/9538* (2019.01)
*G06Q 30/0601* (2023.01)
*G06F 9/451* (2018.01)

(52) U.S. Cl.
CPC ......... *G06Q 30/0643* (2013.01); *G06F 9/451* (2018.02); *G06Q 30/0625* (2013.01)

(56) References Cited

U.S. PATENT DOCUMENTS

| | | | |
|---|---|---|---|
| 9,965,470 B1* | 5/2018 | Fox | G06F 9/00 |
| 10,140,578 B1* | 11/2018 | Podgorny | G06Q 50/01 |
| 10,546,027 B1* | 1/2020 | Parent | G06F 16/90324 |
| 11,257,144 B1* | 2/2022 | Hamel | G06Q 30/0631 |
| 2008/0082499 A1* | 4/2008 | Koski | G06F 16/345 |
| 2008/0133488 A1* | 6/2008 | Bandaru | G06F 40/30 |
| | | | 715/810 |
| 2008/0249764 A1* | 10/2008 | Huang | G06F 40/30 |
| | | | 704/9 |
| 2009/0265307 A1* | 10/2009 | Reisman | G06F 16/345 |
| 2013/0290142 A1 | 10/2013 | Croes | |
| 2017/0200207 A1* | 7/2017 | Aswani | G06Q 30/0282 |
| 2018/0129732 A1* | 5/2018 | Pelleg | G06F 16/3344 |
| 2020/0020000 A1* | 1/2020 | Guy | G06Q 30/0282 |

OTHER PUBLICATIONS

Slava Novgorodov, Ido Guy, Guy Elad, and Kira Radinsky, Generating Product Descriptions from User Reviews, May 13, 2019, In The World Wide Web Conference (WWW '19), Association for Computing Machinery, New York, NY, USA, 1354-1364. (Year: 2019).*

Rossetti, M., Stella, F., Zanker, M., Analyzing user reviews in tourism with topic models, 2016, Information Technology & Tourism (2016) 16:5-21, pp. 5-21. (Year: 2016).*

* cited by examiner

FIG. 2A

Item specifics

| | |
|---|---|
| Condition: | New: A brand-new, unused, unopened, undamaged item (including handmade items). See the seller's listing for full details. See all condition definitions. |
| Return: | Free within 30 days |
| Type: | Boys toy |
| Color: | Red |
| MPN: | VT-B968B |
| Character Family: | Steam Train |
| Brand: | Velocity Toys |
| Recommended Age Range: | 3 years and up |
| Gender: | Boys, Girls |
| Batteries: | Requires 3 AA Batteries (not included) |
| Model: | Toys for kids |
| Theme: | TrainsTrains |
| Product Dimensions: | Length: 11" Width: 3.5" Height: 6" |
| Shipping: | Free and same day |
| Tax: | Free |
| UPC: | 692761860247 |

Derived Age Range: 2-5, 6-9, 10+

- 2-5: 70%
- 6-9: 20%
- 10+: 10%

Derived Gender:

- Boys: 65%
- Girls: 35%

FIG. 3B

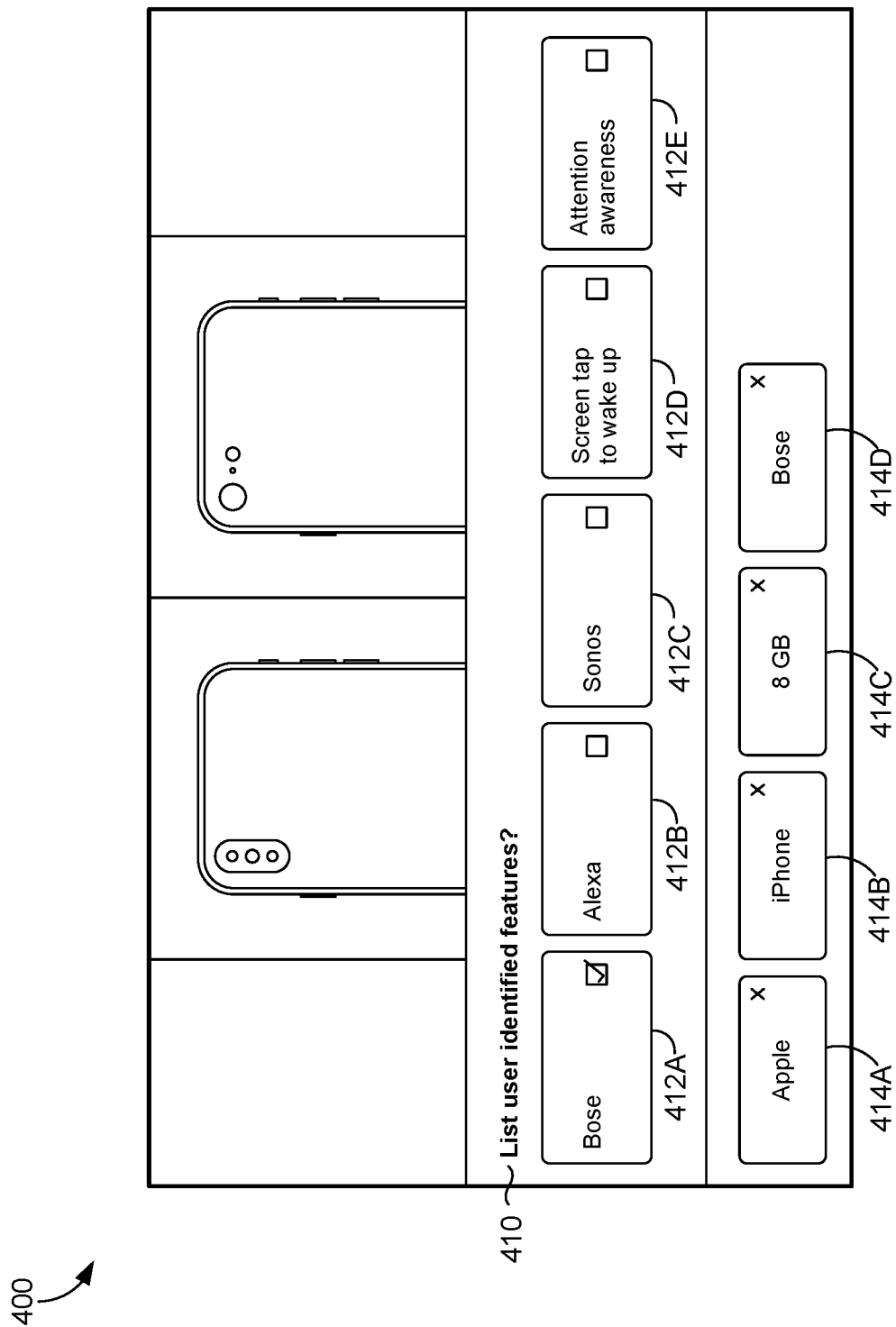

SEARCH SYSTEM, MEDIA, AND METHOD FOR PROVIDING COMMUNICATIONS-BASED COMPATIBILITY FEATURES

BACKGROUND

Users often rely on search systems to help find information stored on computer systems. Such search systems support identifying, for received search queries, search query result items from item databases. Users in particular use item listing platforms (e.g., e-commerce websites) to help identify items having specific item features. An item listing platform can provide an interface for viewing and selecting items from the item listing platform based on the item features. The item listing platform also allows for user interactions and communications about items and item features on the platform. However, an item listing platform can be limited in the manner in which the item listing platform presents information.

By way of example, an item listing platform with searching functionality is a critical mechanism that supports identifying items that are listed in the item listing platform. The item listing platform also allows for user interactions and communications about items and item features. The searching functionality of the traditional item listing platforms is limited in that item listing platforms may specifically rely on standard features that are provided by an item provider including item key features. Standard features and categories ("standard features") (e.g., manufacturer-identified features and categories for a primary item or product) are item features that are considered relevant, important, or worth highlighting for the item by the item provider. Conventional item listing platforms are limited in how they identify and present additional details beyond standard features for items. If a user wants to find non-standard information, the user would need to manually review different types of communications to identify additional useful or relevant information for an item that is of interest to the user. For example, traditional item listing platforms do not automatically provide additional useful or relevant information so that the most useful or relevant information is located where it can be easily accessed and perused. Essentially, standard features are provided without fully understanding how items are further interpreted or used by user or the relationship between the item and other items that a user might be interested in using in combination. Moreover, an item listing platform that provides only standard features results in inefficient functioning of the platform interfaces as the user has to scroll and switch views to find the right data. With the ever-increasing use of search systems for retrieving electronically stored information, improved search systems can be leveraged to efficiently and accurately supplement item listings with more relevant features of the item using existing information related to the item stored in databases.

SUMMARY

Various aspects of the technology described herein are generally directed to systems, methods, and computer storage media, for among other things, providing supplementary item information based on communications-based compatibility features for an item (e.g., primary item) in an item listing platform. In particular, for a given item, communications-based compatibility features are extracted from communications (e.g., questions, answers, and comments from users) about the item. For example, historical user communications can be analyzed and processed to identify common supplementary item information (i.e., communications-based compatibility features) discussed within a threshold number of user communications. The communications-based compatibility features indicate one of the following: an operational compatibility feature, a demographic-based compatibility feature, or a sub-feature compatibility feature corresponding to the primary item. The operational compatibility feature indicates that the primary item is compatible with a secondary item, the demographic-based compatibility feature indicates a derived demographic value associated with the primary item, and the sub-feature compatibility feature indicates a sub-feature of the primary item, where the sub-feature is configured to be listed as a feature of the feature set of the primary item. In this way, supplementary item information for the item may be generated and made readily available (e.g. presented via an interface of the item listing platform) to users.

In operation, a supplementation engine of an item listing platform, accesses communications (e.g., questions, answers, and comments from users) for a primary item. The supplementation engine generates supplementary item information for the item, where the supplementary item information includes a communications-based compatibility feature associated with the item. For example, for an operational compatibility feature, the item can be a primary item that is associated with a secondary item and the communications-based compatibility feature indicates that the primary item is compatible with the secondary item. The communications-based compatibility feature can specifically be non-standard feature (e.g., a feature not provided in a feature set of the primary item from an item provider or manufacturer).

The supplementary item information is provided to cause presentation of a user interface element corresponding to the communications-based compatibility feature on a user interface of the item listing platform. The supplementary item information can be presented as a replacement of a standard feature, in combination with a standard feature, or by adding the supplementary item information in proximity to a standard feature. The user interface element can also explicitly identify a category associated with the supplementary item information.

Accordingly, the embodiments described herein provide a method for presenting additional useful information, as communications-based compatibility features, on a graphical user interface (GUI), wherein the method extracts relevant information that would be useful for a user based on communications associated with the item and presents the information on the GUI, specifically, in a position that is easily accessible by the users so that a user does not need to manually search through hundreds of thousands of communications to find the relevant information.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein:

Figure 2A:
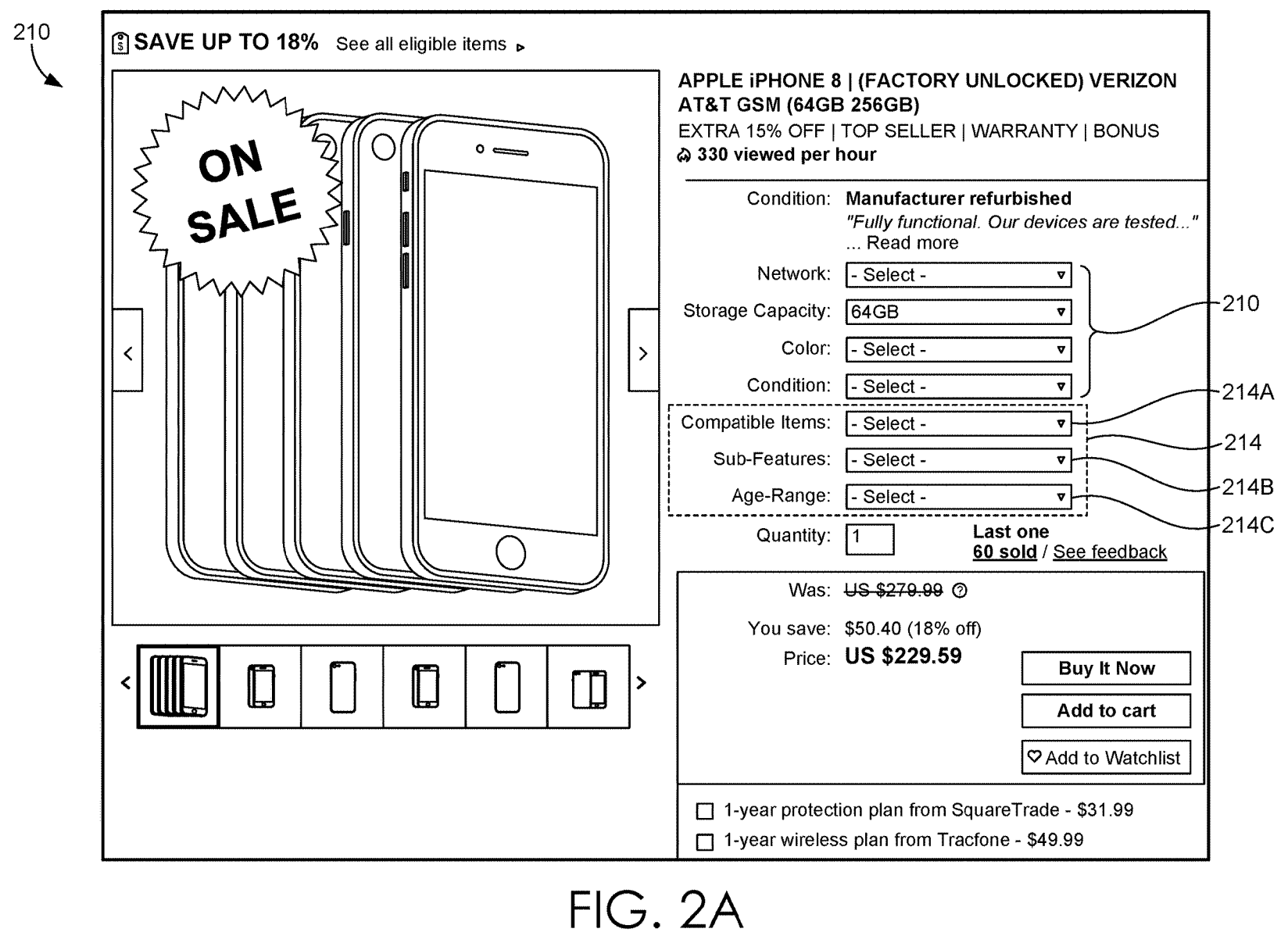

FIGS. 2A-2D are illustrations of example item listing platform interfaces for a supplementation engine in accordance with aspects of the technology described herein;

FIG. 3A-3B is an illustration of an example item listing platform interface for a supplementation engine in accordance with aspects of the technology described herein;

FIG. 4 is an illustration of an example item listing platform interface for a supplementation engine in accordance with aspects of the technology described herein;

DETAILED DESCRIPTION

Figure 1:
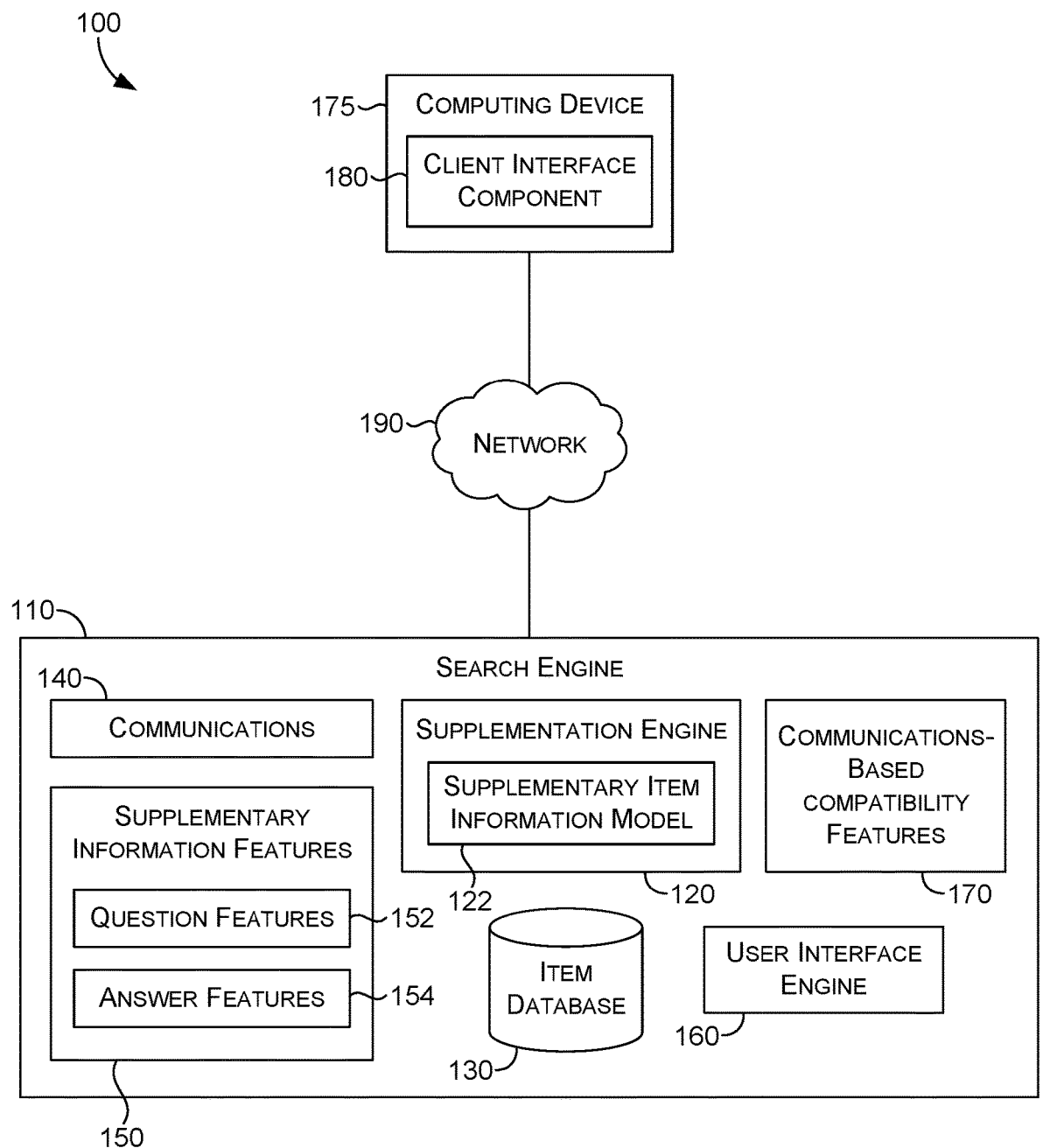
FIG. 1 is a block diagram of an exemplary item listing platform with a supplementation engine, in which embodiments described herein may be employed.
Figure 2B:
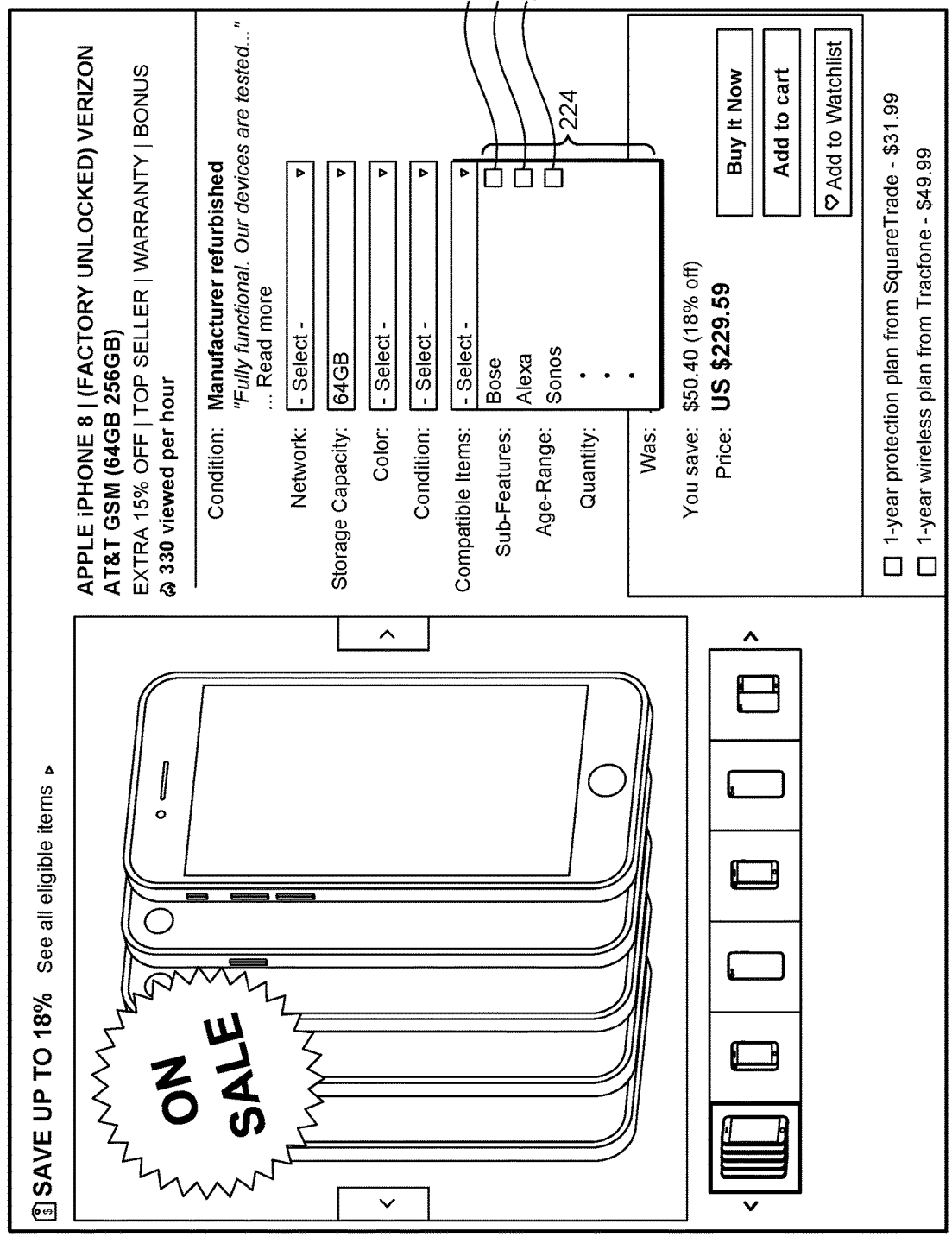
Figure 2C:
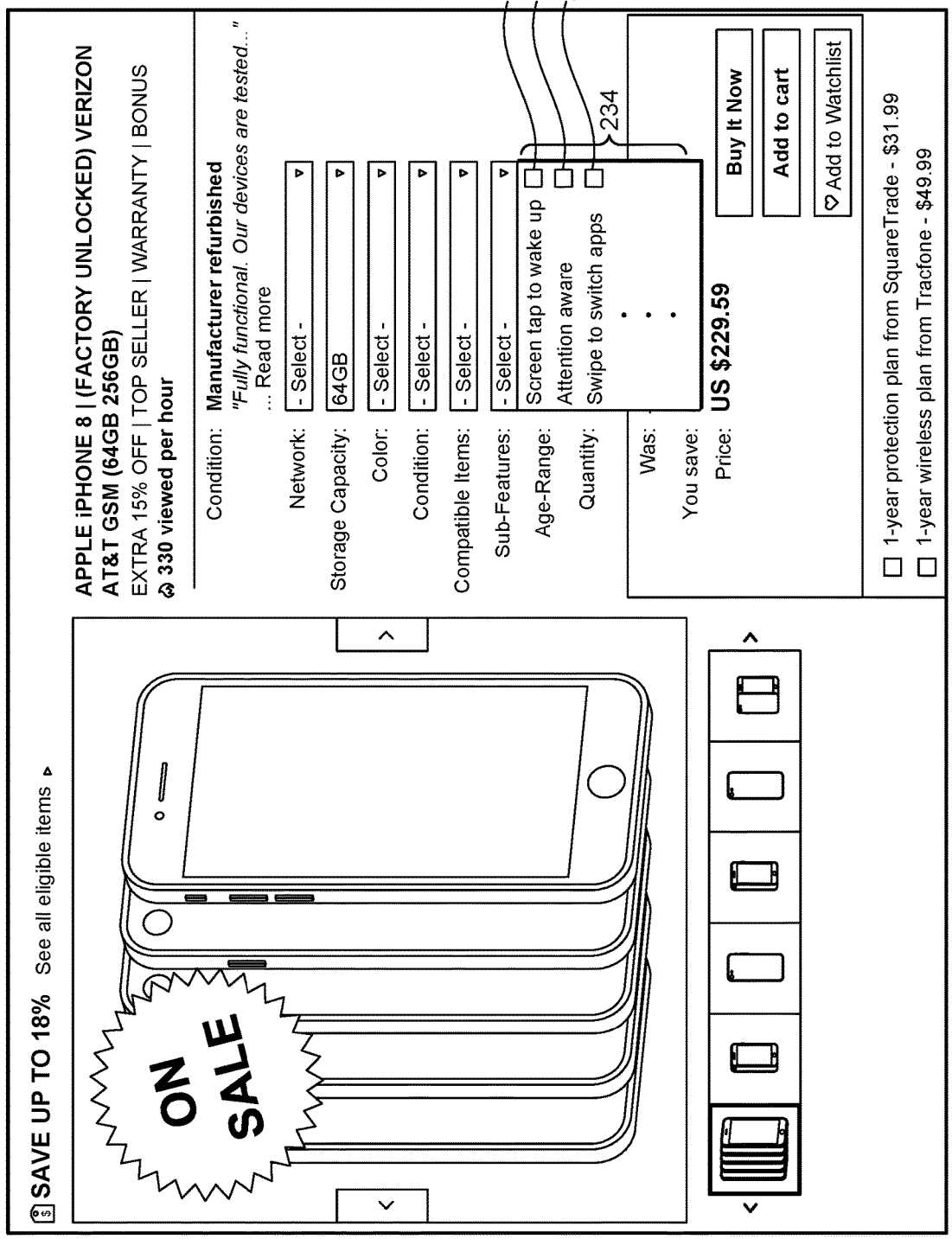
Figure 2D:
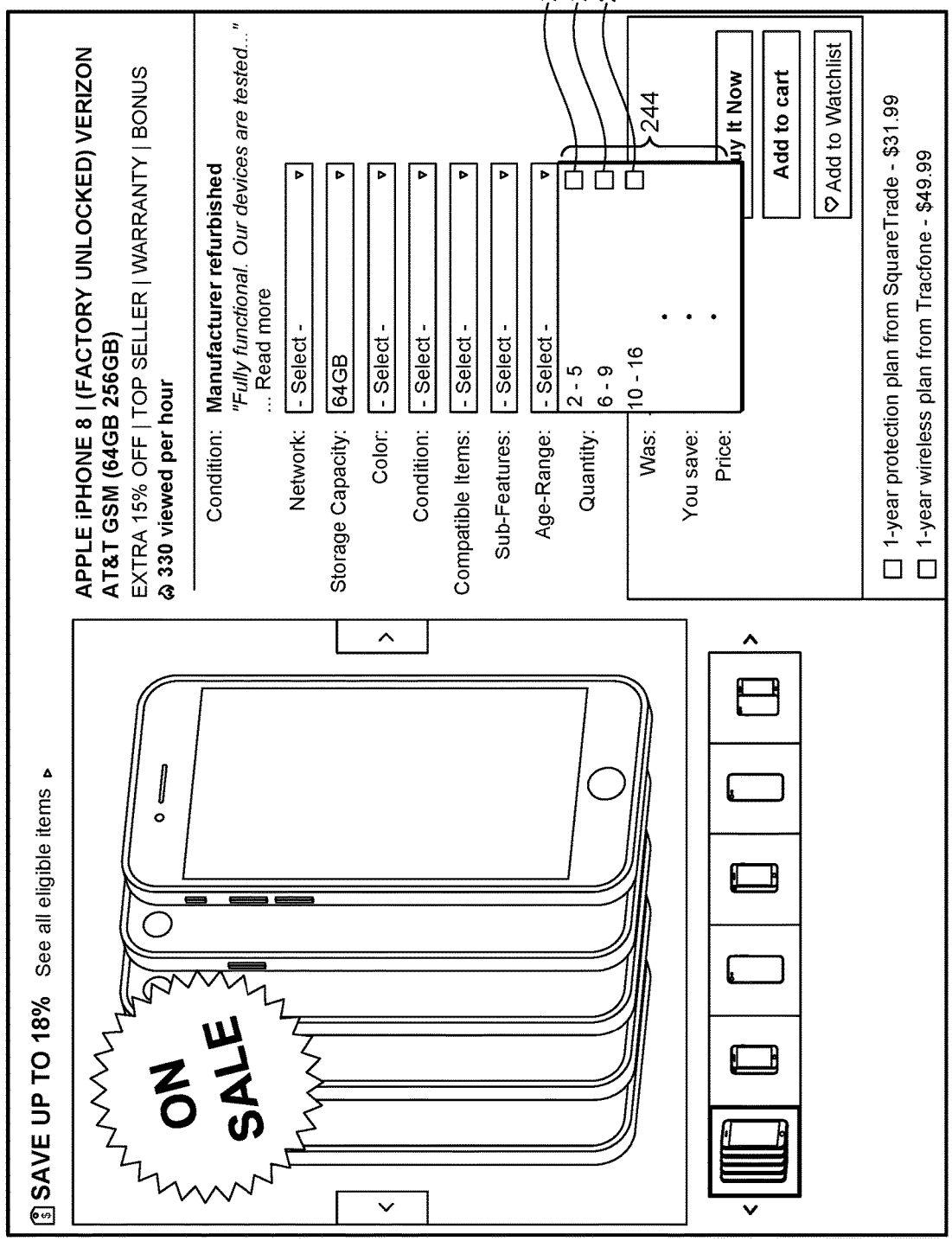

Overview of Aspects of the Technical Problem, Technical Solution, and Technological Improvement Search systems support identifying, for received queries, query result items from item databases. Item databases can specifically be for content platforms or item listing platforms such as EBAY content platform, developed by EBAY INC., of San Jose, California. An item on an item listing platform (e.g., an e-commerce website) can be populated with features relating to an item. Usually these item features are standard features (e.g., manufacturer-identified features) for the item. For example, "iPhone 7" on an item listing platform would include a feature set with a list of features provided by APPLE® that describe certain characteristics, specifications, technical and otherwise, of "iPhone 7." Such a feature set can include standard features of an item that the item provider considers relevant, important or worth highlighting for the item.

Conventional item listing platforms are limited in their capacity to provide additional details beyond standard item features for items. Essentially, standard features are provided without fully understanding how items are further interpreted or used by user or the relationship between the item and other items that a user might be interested in using in combination. The item providers may often not consider other item features (e.g., an unanticipated use case) or a popular pairing with another item that users discover while actively using or owning the item. With regard to the "iPhone 7", the iPhone 7 manufacturer may not have considered the phone's compatibility with a "Harman Kardon Receiver." When the provided feature set on an item listing platform lacks the additional information or features of importance to users, the item listing platform may provide a poor or ineffective platform for decision making purposes. Other relevant item features can be overlooked with the limited methodology of conventional item listing platforms. Moreover, the users are then forced to navigate and click through several different user interfaces and/or user communications (e.g., comments, reviews, etc.) to find the additional features relevant to the user. In this way, conventional item listing platforms (e.g., e-commerce sites) lack such additional information that could be helpful to users (e.g., buyers and sellers) of the item listing platform. As such, an alternative approach for providing an item listing platform that can provide additional item features that are helpful to users would improve computer efficiency in search and efficiency in user navigation of graphical user interfaces for item listing platforms.

Embodiments of the present invention are directed to simple and efficient methods, systems and computer storage media, for among other things, providing supplementary item information based on communications-based compatibility features for an item (e.g., primary item) in an item listing platform. In particular, for a given item, communications-based compatibility features are extracted from communications (e.g., questions, answers, and comments from users) about the item. For example, historical user communications can be analyzed and processed to identify common supplementary item information (i.e., communications-based compatibility features) discussed within a threshold number of user communications. The operational compatibility feature indicates that the primary item is compatible with a secondary item, the demographic-based compatibility feature indicates a derived demographic value associated with the primary item, and the sub-feature compatibility feature indicates a sub-feature of the primary item, where the sub-feature is configured to be listed as a feature of the feature set of the primary item. In this way, supplementary item information for the item may be generated and made readily available (e.g. presented via an interface of the item listing platform) to users.

In operation, communications can be used for generating supplementary item information. In particular, for a given item (i.e., a primary item), communications (e.g., user communications) about the primary item can refer to any imparting or interchange of thoughts, opinions, or information provided via speech, writing, text, video, audio, images or signs. Communications can specifically be associated with items in an item listing platform. Items can be stored in an item database and communications can be accessed from client devices and provided on the item listing platform. The communications related to a primary item may be parsed to extract communications-based compatibility features of the primary item in the item listing platform. The communications are used to identify communications-based compatibility features to indicate an operational compatibility feature, a demographic-based compatibility feature, or a sub-feature compatibility feature. In other words, communications are mined to provide via the item listing platform, features associated with how users use the primary item, which the item provider may not be aware of or has not provided. For example, a specific type of "iPhone" may become popular because it has a specific chipset configuration that is not listed by the "iPhone" manufacturer, APPLE® in a feature set. In another example, a buyer may want to buy a new "iPhone" to replace an old "iPhone" that is compatible with a "Harman Kardon Receiver" and APPLE® has not provided information on whether the new "iPhone" will be compatible with the "Harmon Kardon Receiver."

A supplementation engine of the item listing platform may implement and access a supplementary item information model that supports making predictions on, or identifying of, supplementary information for a primary item based on communications-based compatibility features that are extracted from communications related to the primary item found in a database. As an initial matter, the communications are processed using data mining operations that include filtering out unimportant sentences and selecting important sentences for additional processing. The supplementary item information machine learning model may specifically identify important sentences or phrases as sentences or phrases that are relevant to communications-based compatibility features important to users. Important sentences or phrases may be programmatically defined as features.

Data mining operations support identifying item features of a primary item from communications related to the primary item stored in an item database. By way of example, a feature may be an explicit rating or an implicit rating that is determined from a comment related to an item. A user may provide a comment for an item that may include positive remarks or sentences that reflect a positive review for a feature of the item. Similarly, a user may provide a comment for an item that may include positive remarks or sentences that reflect a positive pairing of the item with a secondary item. Overall, the data mining operations support identifying item features of a primary item from communications related to the primary item stored in an item database. Data mining identifies patterns, descriptions, connections and context around question descriptions, answer descriptions and item descriptions. In this regard, a feature of the question features or the answer features is a relevant characteristic corresponding to a question description, an answer description, or an item description. Feature extraction may be performed using any number of algorithms (e.g., matrix factorization, pattern intersection). Feature extraction may initially start with the user communications, and then build derived values intended to be informative and non-redundant, facilitating the subsequent learning and generalization characteristics.

The supplementary item information can be generated using the supplementary item information model that supports identifying communications-based compatibility features. In particular, supplementary item information searching and gathering is provided based on the supplementary item information model that supports data mining for communications-based compatibility features related to an item. The supplementary item information model may analyze the communications related to a primary item (i.e., the item at issue) to determine communications-based compatibility features for the primary item that are not provided in the standard features included in the feature set of the primary item. The communications-based compatibility features are features determined to be relevant to users of the primary item.

Advantageously, in order to find the relevant communications-based compatibility features of the primary item, identifying answer features may be based on first identifying a set of communications having a threshold minimum similarity scores based on question features that indicate an extent that the corresponding set of communications include sufficiently similar questions regarding a communications-based compatibility feature of the primary item. In this regard, the similarity scores of answer features for a set of answers to the corresponding set of communications may then be compared to a threshold minimum that indicate that an extent that the set of answers to the question is actually accurate.

In some examples, a threshold minimum number of answer features to the corresponding question features with threshold minimum similarity scores must be identified for an answer feature to be considered a communications-based compatibility feature. In this regard, the communications-based compatibility features would more accurately reflect item features that are relevant to users. It is contemplated that other features may be prioritized during data mining operations for achieving specific goals in generating the communications-based compatibility features. In one embodiment, the set of answer features may be mapped to an item or an item category and an item classification. As such, features may be assigned to elements of an ontology system or other classification categories.

The communications related to a primary item may be accessed using an item descriptors for the primary item. The communications related to the primary item may be analyzed using the supplementary item information model developed in part based on analyzing user communication or item descriptors. The machine learning model training supports analyzing the communications to make predictions or identify communications-based compatibility features that are relevant to users. Identifying communications-based compatibility features is based on comparing the question features to answer features. In some examples, identifying communications-based compatibility features is based on positive remarks, comments, or sentences regarding features of the primary item. In some other examples, identifying communications-based compatibility features is based on positive sentences, comments, reviews, or remarks indicating a positive pairing of the primary item with a secondary item. The comparison logic for identifying feature similarity may include fuzzy logic, neural network, finite state machine, support vector machine, logistic regression, clustering, or machine-learning techniques, similar statistical classification processes, or combinations of these to identify and compare corresponding features to determine similarity via the supplementary item information model.

Using the supplementary item information model, predictions may be made about answer features of communications related to the primary item and by extension predictions may be made about communications-based compatibility features that correspond to the primary item. For example, communications related to a primary item (e.g., "iPhone pairs very well with Harmon Kardon Receiver", "Does iPhone work well with Harmon Kardon Receiver") may be received and analyzed to identify question features (e.g., "iPhone", "Harmon Kardon Receiver" "pair", "work", "compatibility"), in particular, the question descriptions are based on the features defined from training the machine-learning model. The question features are compared to answer features to identify a communications-based compatibility feature for the primary item (e.g., "iPhone"). For example, Harmon Kardon Receiver may be selected as a compatible item for a communications-based compatibility feature where a comment identified recited, "iPhone works great with Harmon Kardon Receiver via Bluetooth®. The connection is strong and rarely fails. Apply once and great for a night out on the town." Harmon Kardon Receiver is selected because the question features (i.e., iPhone", "Harmon Kardon Receiver" "pair", "work", "compatibility") are most similar (e.g., based on a similarity score from a comparison logic) to the answer features identified in the comment. Further, a degree of compatibility is determined based on the answer features. For example, a 90% compatibility may be associated with "Harmon Kardon Receiver" in relation to the "iPhone" where a comment identified recited "iPhone works great with Harmon Kardon Receiver. The connection can be weak at times when the receiver is over 300 feet away from the iPhone, but the connection is strong over 90% of the time."

In some examples, multiple positive comments with minimum similarity scores for corresponding question description and answer features may be required for an answer feature to be identified as a communications-based compatibility features. In some embodiments, an item category and an item classification that are determined based on comparing the question features to the answer features are also identified and provided via a user interface or leveraged additional search engine functionality (e.g., ranking, query suggestions, query result item interfaces, secondary item suggestion, item feature lists, feature category lists) associated with the search engine.

Supplementary information based on the communications related to the primary item can be generated using components of item listing platform. The supplementary information may include communications-based compatibility features identified for the primary item. The communications may be processed to determine communications-based compatibility features for the primary item using several different techniques. As an initial matter, items, and by extension item titles, may be associated with item communications and standard features. Item features describe elements or aspects of an item. For example, an item feature may include a characteristic of the item. In this regard, the item features may include text corresponding to an attribute of an item. For example, a phone item feature may include a description indicating a size of the phone, a camera configuration, Bluetooth compatibility, etc.

In addition, item reviews of items in an item listing platform may describe a problem, a solution and a corresponding item, along with an item rating. For example, after using a phone, a user or item reviewer may self-report on the phone and provide insights of the problem they faced and how the phone resolved the problem. Similarly, an item question may include a problem and an item title. An item answer may include a solution, a problem and an item title. The communications, each alone or in combination, may be used to define communications used for identifying the item titles and communications-based compatibility features for the items. In particular, the communications are analyzed to extract communications-based compatibility features. The communications-based compatibility features may be programmatically defined and organized to be retrieved as discussed herein in more detail. In one example, the communications-based compatibility features are stored to correspond to a feature list of an item, an answer, a question or an item description.

Communications-based compatibility features can be distinguished from standard features. In particular, communications-based compatibility features that are not provided in the standard features may be determined by comparing the communications-based compatibility features with the standard features for the primary item. In some examples, standard features may include a feature set for an item, the set of features is communicated from an item provider (e.g., manufacturer) to the item listing platform. In some other examples, the item listing platform may crawl through the web (e.g., World Wide Web, Internet) to identify the standard features of the primary item. In other examples, a user of the item listing platform may provide the standard features when adding an item to the item listing platform. The item listing platform may store the standard features such that when a user lists an item on the item listing platform for selling, the standard features automatically populate for the item on the item listing platform.

In another embodiment, communications can be used specifically to determine communication-based compatibility features that are demographic-based compatibility features. By way of background, demography generally refers to a specific segment of users (e.g., users of the item listing platform). In particular, the segment of users can have shared characteristics. A demographic-based compatibility feature can be a feature that identifies a segment of users for whom an item would be relevant to. The demographic-based compatibility feature can be associated with demographic category. An item provider can determine relevant demographic categories and corresponding demographic-based compatibility features for the demographic categories. For example, a demographic category can be "gender" or "age range" with corresponding demographic-based compatibility features "male", and "ages 4 and over". As discussed more generally above, standard features are provided without fully understanding the items, and more specifically with regard to demography, standard features (including demographic-based compatibility features and corresponding demographic categories) are provided without the item provider understanding the different segments of users or impact on different segments of users. As such, communication-based compatibility features can be mined to provide supplementary item information beyond the standard features of the item provider.

By way of example, the communications can be accessed to determine that the age range of a particular toy is more suitable for an alternative age range (e.g., narrower or broader age range). A degree of suitability may also be determined for an alternative age range based on the communications (e.g., ratings, questions, answers, comments). A demographic-based compatibility feature for gender may be changed (e.g., from male to female) or redefined as a combination (e.g., from female to both male and female) if it is determined that an item initially determined as suitable (e.g., by item provider) for a single gender is also suitable for another gender. Moreover, communications-based compatibility features may further reveal that a particular demographic category and corresponding demographic-based compatibility features should be provided to a user via a user interface. It is further contemplated that demographic-based compatibility features are identified as segmented information (e.g., a frequency distribution) for specific demographic segments. The communications used to determine demographic-based compatibility features may be associated with the demographic-based compatibility features such that the communications are configured to be presented when a user selects the demographic-based compatibility feature and/or derived demographic values. Other variations and combinations of demographic-based compatibility features indicating derived demographic values based on communications-based compatibility feature are contemplated with embodiment described herein.

In operation, the identified or determined communications-based compatibility features may be provided via a user interface as a response to a request associated with the primary item. The communications-based compatibility features can be used in seller experiences and buyer experiences in a variety of ways on an item listing platform. In one example, the communications-based compatibility features may be added to a feature set of the primary item, such that the feature set may then include manufacturer-identified features and the communications-based compatibility features. With regard to such an example, the feature set including the communications-based compatibility feature may be automatically populated to an item listing for the primary item. For example, for an "iPhone," identified communications-based compatibility features, "specific chipset configuration" and "Compatible with Harmon Kardon Receiver," may be included in an "iPhone" item listing on an item listing platform. Where the feature set with manufacturer-identified features of the primary item includes categories for features, the communications-based compatibility features may be presented in conjunction with a category. For example, "Harmon Kardon Receiver" may be presented in conjunction with category, "Compatible Items," and "Chipset Configuration" may be presented in conjunction with category, "Additional Information." In some examples, the communication-based compatibility feature may be configured to further indicate a degree of compatibility of the secondary item with the primary item. For example, "90% Compatible with Harmon Kardon Receiver" may be included in an "iPhone" item listing on the item listing platform. In another example, the secondary item may be presented as a related item or a suggested item on the user interface in conjunction with an item listing for the primary item based on the operational compatibility feature. In one embodiment, the supplementary item information may be configured to present communications used to determine the corresponding communications-based compatibility feature in response to user selection of the user interface element for the communications-based compatibility feature. For example, the user interface may be configured such that a user may select a "Chipset Configuration" for an "iPhone" listing on an item listing platform and the selection may cause for presentation of communications corresponding to the determination of the communications-based compatibility features "Chipset Configuration" on the user interface.

Demographic-based compatibility features can also be provided via a user interface of the item listing platform. The demographic-based compatibility features can be presented based on the type of demographic-based compatibility features that are derived from the communications. For example, the demographic-based compatibility features can be used to replace or be presented in combination with a standard demographic-based feature. A demographic-based compatibility feature that triggers generating a demographic category can be caused to be displayed either alone or with the corresponding demographic category. For example, ethnicity may not have been a standard feature (i.e., category) identified for a particular item; however based on the communications, ethnicity can be displayed as a demographic category and the derive value of the ethnicity (e.g., Native American) can be displayed with the value of the demographic category for the item. Moreover, with reference to demographic-based compatibility features that are associated segmented information (e.g., a frequency distribution) for specific demographic segments, a histogram or other similar user interface element can be used to present the different demographic segments. For example, a "Star Trek Series Set" may have been initially identified for ages 7-14, and the demographic-based compatibility feature may identify 5-7 as 20%, 8-12 as 45%, 13-14 as 0% and 15+ as 35% as the different demographic segments and their corresponding frequency distribution. In some examples, the demographic-based compatibility features may be used to determine whether the primary item is presented as a search result for a search query. For example, the "Star Trek Series Set" set described above may be shown as a search result for a query requesting items for a 16 year old. Age ranges or age may also be presented as search filters where selection of a search filter for age 16 may refine the search results for a movie series to present results that prioritize movie series such as the above-identified "Star Trek Series Set" with a demographic-based compatibility feature with a 35% frequency for demographic segment 15+ age range.

In another example, the search engine may be configured to provide communications-based compatibility features as answers to queries or questions related to the primary item. For example, "does iPhone pair well with Harmon Kardon Receiver" may automatically be answered via the user interface with "Yes, iPhone is compatible with Harmon Kardon Receiver." In yet another example, the communications-based compatibility features may be automatically populated to be presented as a note in an item listing for the primary item. For example, an item listing for iPhone may be populated with "Note: Specific chip set configuration, Compatible with Harmon Kardon Receiver." For another example, an item listing for a "Surface" may be populated with "80% Compatible with Alexa." Communications-based compatibility features may also be presented to a seller listing the primary item on the item listing platform as optional information to add to the listing. In that regard, the communications-based compatibility features, individually or as a group, may be selectable for presentation in the item listing by the seller using the user interface. Communications-based compatibility features may also be used by the search engine to present items (primary item and secondary items) as suggestions in response to search queries or when a user is visiting a listing for an item. For example, "Harmon Kardon Receiver" may be presented as a suggestion when a user is visiting a listing for an "iPhone." Similarly, "iPhone" may be presented as a suggestion to a user when an indication that a user owns a "Harmon Kardon Receiver" or is looking to buy a "Harmon Kardon Receiver."

In another example, the communications-based compatibility features may be presented to users or buyers searching for items on the item listing platform as optional or selectable filters and/or categories of filters to filter search results based on selected communications-based compatibility features. The user interface may be configured as a search interface a selectable set of features for result items for corresponding categories, such that selection of one or more features may filter the search results to prioritize items including the selected one or more features in their corresponding supplementary item information. For example, selectable filters for compatible items may be presented to users, such that a user that selects a "Harmon Kardon Receiver" under a compatible items filter may be presented with search results filtered to only include items with a communications-based compatibility feature including the "Harmon Kardon Receiver" in its supplementary item information. Similarly, selected filters for demographic-based compatibility features may be selectable such that when a user selects a filter for a desired age or age range, the search results may be filtered to prioritize items with communications-based compatibility features including the selected age or age range in the items' supplementary item information.

Accordingly, extracting relevant information that would be useful for a user based on historical communications associated with an item, and presenting the relevant information (e.g., communications-based compatibility features) in a position that is easily accessible and searchable by the users solves the problems of the conventional item listing platforms in that a user does not need to manually search through hundreds of thousands of communications to find the relevant information.

Embodiments of the present invention have been described with reference to several inventive features (e.g., operations, systems, engines, and components) associated with a search system having the supplementary item information model. Inventive features described include: operations for modeling communications regarding a primary item that are analyzed for identifying communications-based compatibility features that correspond to user relevant features of the primary item. Functionality of the embodiments of the present invention have further been described, by way of an implementation and anecdotal examples, to demonstrate that the operations for providing communications-based compatibility features for a primary item using a supplementation engine are an unconventional ordered combination of operations that operate with a supplementation engine search engine as a solution to a specific problem in search technology environment to improve computing operations and user interface navigation in item listing and search systems. Overall, these improvements result in less CPU computation, smaller memory requirements, and increased flexibility in search systems.

Overview of Example Environments for Providing an Item Listing Platform with a Supplementation Engine Aspects of the technical solution can be described by way of examples and with reference to FIG. 1, FIG. 2A-2C, FIG. 3 and FIG. 4. With reference to FIG. 1, FIG. 1 illustrates an exemplary technical solution (i.e., item listing platform 100) in which implementations of the present disclosure may be employed. In particular, FIG. 1 shows a high level architecture of the item listing platform 100 having components in accordance with implementations of the present disclosure. The technical solution environment includes a search engine 110, supplementation engine 120 (including supplementary item information model 122), item database 130, user communications 140, supplementary information features (including questions features 152 and answer features 154), user interface engine 160, communications-based compatibility features 170, computing device 175 (including client interface component 180) and network 190. The components of the search system 100 may communicate with each other over one or more networks (e.g., public network or virtual private network "VPN") as shown with network 190. The network 190 may include, without limitation, one or more local area networks (LANs) and/or wide area networks (WANs). The computing device 170 may be a client computing device that corresponds to the computing device described herein with reference to FIG. 7.

The components of the item listing platform can operate together to provide functionality for generating and presenting supplementary item information as described herein. In particular, the item listing platform may implement several components (e.g., search engine 110, supplementation engine 120) to perform operations associated with providing communications-based compatibility features for a primary item. By way of background, the search engine can be part of the item listing platform that supports access to an item (or product) database. The items in the items database may be stored based on a data structure having a structural arrangement of items (e.g., an item category and an item classification system). For example, an item database may be implemented with a database schema that stores items based on item titles. Items in the items database can further include standard features (e.g., manufacturer-identified item features) and retrieved communications such as, item descriptions, item reviews, item related queries, item related questions, item related answers, seller provided item information, buyer provided item information, etc. can also be stored on the search engine.

A search engine in the item listing platform may receive a primary item for processing. The search engine may support different types of user interfaces for providing communications-based compatibility features for a primary item. In particular, the user interface may be configured to support determining the communications-based compatibility features for the primary item based on communications related to the primary item identified in an item database. The search engine may also support different types of user interfaces for providing communications related to items in the item listing platform. For example, the search engine may support communications in the form of speech, text, signs, video, audio, images, etc.

Communications (e.g., communications 140) may be stored on the search engine of the item listing platform. Communications related to the primary item may be identified within communications in the item listing platform. In some examples, communications related to the primary item may be extracted by crawling the web or internet. Communications related to the primary item can include questions, queries, comments, answers, reviews, item descriptions, likes, ratings, seller provided information, and buyer provided information for the primary item in the item listing platform. For example, a user may have an "iPhone 7" and may have commented on the item listing platform regarding the phone's superior compatibility with a "Harmon Kardon Receiver." In another example, users may have had a communication session (e.g., questions and answers, series of comments, etc.) discussing a specific chipset configuration of the "iPhone 7" particularly enjoyed by the users. In another example, users may have communications on the item listing platform regarding the phone's enjoyment by users of a particular age or age range.

The supplementation engine is responsible for generating supplementary item information. The supplementation engine accesses a plurality of communications. The plurality of communications include information about item (e.g., a primary item). The supplementation engine access the plurality of communications from the communications provided on the search engine. The plurality of communications can include questions, answers, and descriptions provided via user interfaces associated with an item listing platform. The item listing platform can provide interfaces for receiving the communications and interfaces for presenting communications-based compatibility features.

The supplementation engine generates the supplementary item information having a communications-based compatibility feature. The communications-based compatibility feature is associated with corresponding items (e.g., a primary item and a secondary item). In particular, the communications-based compatibility feature indicates one of the following: an operational compatibility feature, a demographic-based compatibility feature, or a sub-feature compatibility feature corresponding to the primary item. The operational compatibility feature indicates that the primary item is compatible with a secondary item, the demographic-based compatibility feature indicates a derived demographic value associated with the primary item, and the sub-feature compatibility feature indicates a sub-feature of the primary item, where the sub-feature is configured to be listed as a feature of the feature set of the primary item.

In some examples, the communications-based compatibility feature also indicates a degree to which the primary item is compatible with the secondary item. Moreover, the communications-based compatibility feature is not a standard feature in a feature set of the primary item. The supplementation engine also generates supplementation information having a communications-based compatibility feature that indicates a sub-feature of an item (e.g., primary item). The sub-feature can be configured to be listed as a feature of the feature set of the primary item. Further, the supplementation engine generates supplementation information having a communications-based compatibility feature that indicates a demographic-based compatibility feature of an item (e.g., primary item). The demographic-based compatibility feature can be configured to replace or be presented in combination with a standard demographic-based feature, alone on in combination with demographic category, and/or as a frequency distribution for specific demographic segments.

In operation, the supplementation engine generates the supplementary item information based on determining that communications in the plurality of communications indicates that the primary item is compatible with the secondary item, the primary item includes a sub-feature, or the primary item includes a demographic-based compatibility feature. Determining that the communications indicate that the primary item is compatible with the second item, determining the communications identify a sub-feature of the primary item, or determining the communications identify a demographic-based compatibility feature of the primary item can be based on supplementary item information model. The supplementary item information model supports making predictions on, or identification of, supplementary information for a primary item based on communications-based compatibility features that are extracted from communications related to the primary item found in a database. The supplementation engine may support text classification as part of natural language processing of the communications.

At a high level, the supplementation engine may include a supplementary item information model that is a statistical model for extracting communications-based compatibility features important to users from communications related to an item. The statistical model (i.e., a machine-learning model) implements one or more machine learning classifiers. The machine-learning model is trained based on communications of an item listing platform, where training may be based on Convolutional Neural Network and Bidirectional Long Short-Term Memory encoding. In particular, text may be analyzed at a character level using convolution network techniques. Convolution neural networks support deep learning without artificially embedding knowledge about words, phrases, sentences, or any other syntactic or semantic structures associated with language. Bi-directional long short-term memory (Bi-LSTM) is an artificial neural network where connections between units form a directed graph along a sequence. In particular, Bi-LSTM may be used for processing sequential data. The supplementation engine may implement both a convolutional neural network and Bi-LSTM for encoding and classifying a variety of identified communications related to an item. For example, the convolution neural network may be used to encode sentences into characters and the characters are processed using a Bi-LSTM to build a model of contextual information.

The supplementary information model supports several different operations. The supplementary information model can be used to identify question features and answer features from the plurality of communications. The supplementary information model can also be used to determine that a threshold number of question features and corresponding answer features identify the primary item as being compatible with the secondary item. The supplementary information model can also be used to determine that a threshold number of question features and corresponding answer features identify the primary item as having a sub-feature. In some examples, the supplementary information model can also be used to determine relevance of the communications to the primary item. In this regard, the supplementary item information can use different types of activities associated with a communication (e.g., a number of stars, satisfaction ratings, likes, etc.) to determine relevance of supplementary information gathered from the communication.

The supplementation engine further provides the supplementary item information to a computing device (e.g., computing device 175) operating a client interface component (e.g., client interface component 180). The supplementary item information is provided to cause presentation of a user interface element corresponding to the communications-based compatibility feature. The supplementation engines operates with a user interface engine (e.g., user interface engine 160) to cause presentation of user interface elements corresponding to the communications-based compatibility feature. The user interface elements can be presented via a client interface component on a computing device. The user interface element (as shown in FIG. 4) can be presented proximate to one or more standard features in the feature set of the primary item. The user interface element explicitly identifies a category associated with the supplementary item information. Also, the user interface element (as shown in FIGS. 2A-2D) can be presented as a drop down menu for a category associated with the supplementary item information. In some examples, the supplementation engine operates with a user interface engine to cause presentation of the primary item based on the supplementary item information in response to a search query.

Embodiments of the present invention may further be described with reference to FIGS. 2A, 2B, 2C, 3, and 4 that provide illustrations and operations of user interfaces associated with components of the item listing platform 100. At a high level, the user interfaces support improving computer operations based on improving user navigation based on supplementary item information searching and providing. The supplementary item information searching and providing allows for user interface interaction models (e.g., item feature sets) that use the components of the item listing platform to provide novel user interfaces as described in more detail below.

With reference to FIGS. 2A-2D, FIGS. 2A-2D illustrate example interfaces that are used for providing supplementary item information for an item. The user interface 210 may be configured as an item query input interface (e.g., item buying interface, item selling interface) such that a user may select a set of features for an item for corresponding categories as a search query. The supplementary item information 214 is presented proximate to standard features (e.g., 210) of an item. In particular, supplementary item information 214 is presented in the form of a drop down menu (e.g., 224, 234, and 244) including operational compatibility features (e.g., 224A, 224B, 224C, . . . ), sub-feature compatibility features (e.g. 234A, 234B, 234C, . . . ), and demographic-based compatibility features (e.g., 244A, 244B, 244C, . . . ) associated with corresponding compatible items category 214A, sub-features category 214B, and age-range category 214C, respectively. Upon selecting a category, the user interface 220, 230, or 240 may be generated having the corresponding supplementary item information for the selected category (e.g., 214A, 214B, 214C). In some examples, the user interface may be configured as a search interface (e.g., item search interface) such that a user may select a set of features for result items for corresponding categories, such that selection of one or more features may filter the search results to prioritize items including the selected one or more features in their corresponding supplementary item information. The supplementary item information for each item is generated based on supplementary item information searching and corresponding components.

Figure 3A:

With reference to FIG. 3A, FIG. 3A illustrates an additional example item listing platform interface for providing supplementary item information. As discussed, supplementary item information may be presented as user interface elements corresponding to communication-based compatibility features of an item in an item listing platform. For example, the user interface elements 310A and 310B may be configured to be presented proximate to standard features (e.g., 314A-314L). The user interface elements 310 may further identify a category (e.g., Compatible Items 310A, Sub-Features 310B) for associated supplementary item information (e.g., compatibility features 312A and sub-features 312B). The supplementary item information may be determined based on communications related to the item using the supplementation engine. The supplementary item information including communications-based compatibility features are determined based on comparing question features and answer features of the communications. As such, the supplementary item information reflects an improved set of features for an item compared to basic standard features provided by conventional item listing platforms.

With reference to FIG. 3B, FIG. 3B illustrates an example item listing platform interface for providing demographic-based compatibility features. As discussed, demographic-based compatibility features may be presented as user interface elements corresponding to demographic categories. For example, the user interface elements 330A, 330B, and 330C may be configured to be presented proximate to standard features (e.g., 340A-340P). The user interface elements 332A-330C may further identify a category (e.g., Gender 330A, Derived Age Range 330B, Derived Gender 330C) for associated derived values of the demographic-based compatibility features (e.g., derived gender segments 332A, derived age segments 332B, derived age frequency distribution 332C, derived gender frequency distribution 332D).

The demographic-based compatibility features may be presented based on the type of demographic-based compatibility features that are derived from the communications. For example, the demographic-based compatibility features can be used to replace or be presented in combination with a standard demographic-based compatibility feature (e.g., derived gender segments 332A). For example, Gender 330A may have been a standard feature (e.g., category) identified for the item with only Boys listed as a segment of users. However, communications may be accessed to determine that the item is suitable for girls as well. The demographic-based compatibility feature for Gender 330A may be redefined as a combination to the derived gender segments 332A (e.g., from boys to both boys and girls). In the alternative, communications may be used to reveal that a particular demographic category (e.g., Derived Age Range 330B, Derived Gender 330C) and corresponding demographic-based compatibility features (e.g., derived age segments 332B, derived age frequency distribution 332C, derived gender frequency distribution 332D) should be provided as user interface elements in the item listing platform interface.

Additionally, demographic-based compatibility features that are associated segmented information (e.g., a frequency distribution) for specific demographic segments, a histogram (e.g., derived age frequency distribution 332C, derived gender frequency distribution 332D) may be used to present the different demographic segments as user interface elements. For example, the item may have been initially identified (e.g., Recommended Age Range 340H) for a specific age range (e.g., 3 years and up) in standard features, and the demographic-based compatibility feature (e.g., derived age frequency distribution 332C) may identify and be presented as a histogram 334 with derived frequencies for 2-5 as 70% (e.g., age range frequency 334A), 6-9 as 20% (e.g., age range frequency 334B), and 10+ as 10% (e.g., age range frequency 334C) as the different demographic segments and their corresponding frequency distribution.

Similarly, the item may have been initially identified for a specific gender (e.g., boys) in the standard features, and the demographic-based compatibility feature (e.g., derived gender frequency distribution 332D) may identify and be presented as a histogram 336 with derived frequencies for boys as 65% (e.g., gender frequency 336A) and girls as 35% (e.g., gender frequency 336B) as the different demographic segments and their corresponding frequency distribution. The demographic-based compatibility features may be determined based on communications related to the item using the supplementation engine. The supplementary item information including demographics-based compatibility features are determined based on comparing question features and answer features of the communications. As such, the demographic-based compatibility features reflect an improved set of demographic features for an item compared to basic standard features provided by conventional item listing platforms.

With reference to FIG. 4, FIG. 4 illustrates an example item listing platform interface for providing supplementary item information on a seller interface. For example, FIG. 4 illustrates an item listing platform 400 presenting a user with selectable user interface elements (e.g., 412A-412E) corresponding to communications-based compatibility features identified as supplementary item information. The item listing platform 400 may allow a user to select (e.g., 410) any or all identified features for presentation with standard features (e.g., 414A, 414B, and 414C) of the item. In this regard, the item listing platform allows users to select what communications-based compatibility features the user wants displayed with the user provided item. As such, the item listing platform reflects an improved navigational platform for user to select additional set of features for an item compared to basic standard features provided by conventional item listing platforms.

Example Methods for Providing Supplementation Operations

Figure 5:
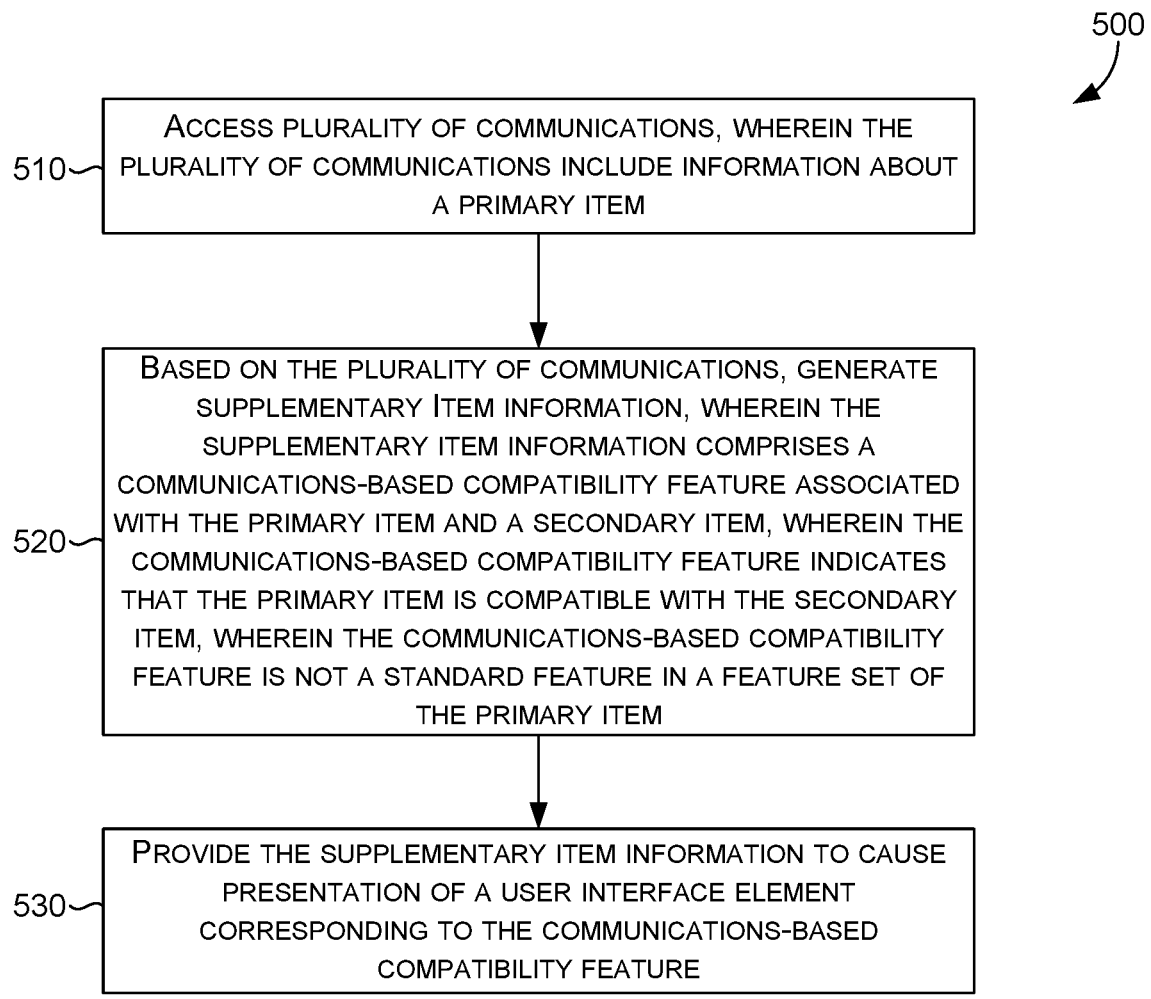
FIG. 5 provides a first example method of providing supplementation operations, in accordance with aspects of the technology described herein.
Figure 6:
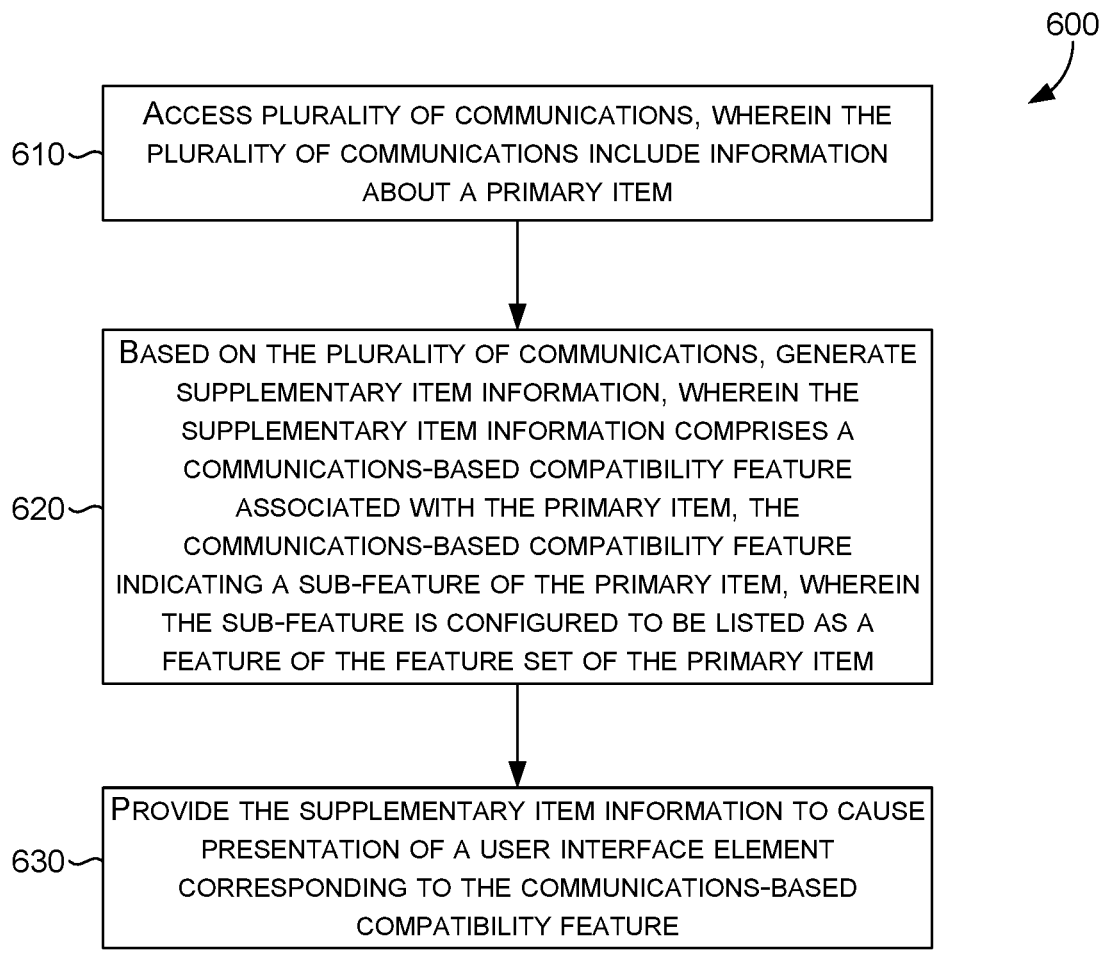
FIG. 6 provides a second example method of providing supplementation operations, in accordance with aspects of the technology described herein.

With reference to FIGS. 5 and 6, flow diagrams are provided illustrating methods for providing supplementation operations for an item listing platform. The methods may be performed using the item listing platform environment described herein. In embodiments, one or more computer storage media having computer-executable instructions embodied thereon that, when executed, by one or more processors can cause the one or more processors to perform the methods in the item listing platform.

Turning to FIG. 5, a flow diagram is provided that illustrates a method 500 for providing supplementation operations: Initially, at block 510, a plurality of communications that include information about a primary item are received. At block 520, supplementary item information is generated based on the plurality of communications. The supplementary item information comprises a communications-based compatibility feature associated with the primary item and a secondary item indicating that the primary item is operationally compatible with the secondary item. The communications-based compatibility feature is not a standard feature in a feature set of the primary item. At block 530, the supplementary item information is provided to cause presentation of a user interface element corresponding to the communications-based compatibility feature.

Turning to FIG. 6, a flow diagram is provided that illustrates a method 600 providing replica set operations. Initially, at block 610, a plurality of communications that include information about a primary item are received. At block 620, supplementary item information is generated based on the plurality of communications. The supplementary item information comprises a communications-based compatibility feature associated with the primary item that indicates a sub-feature of the primary item. The sub-feature is configured to be listed as a feature of the feature set of the primary item. At block 630, the supplementary item information is provided to cause presentation of a user interface element corresponding to the communications-based compatibility feature.

Example Operating Environment

Figure 7:
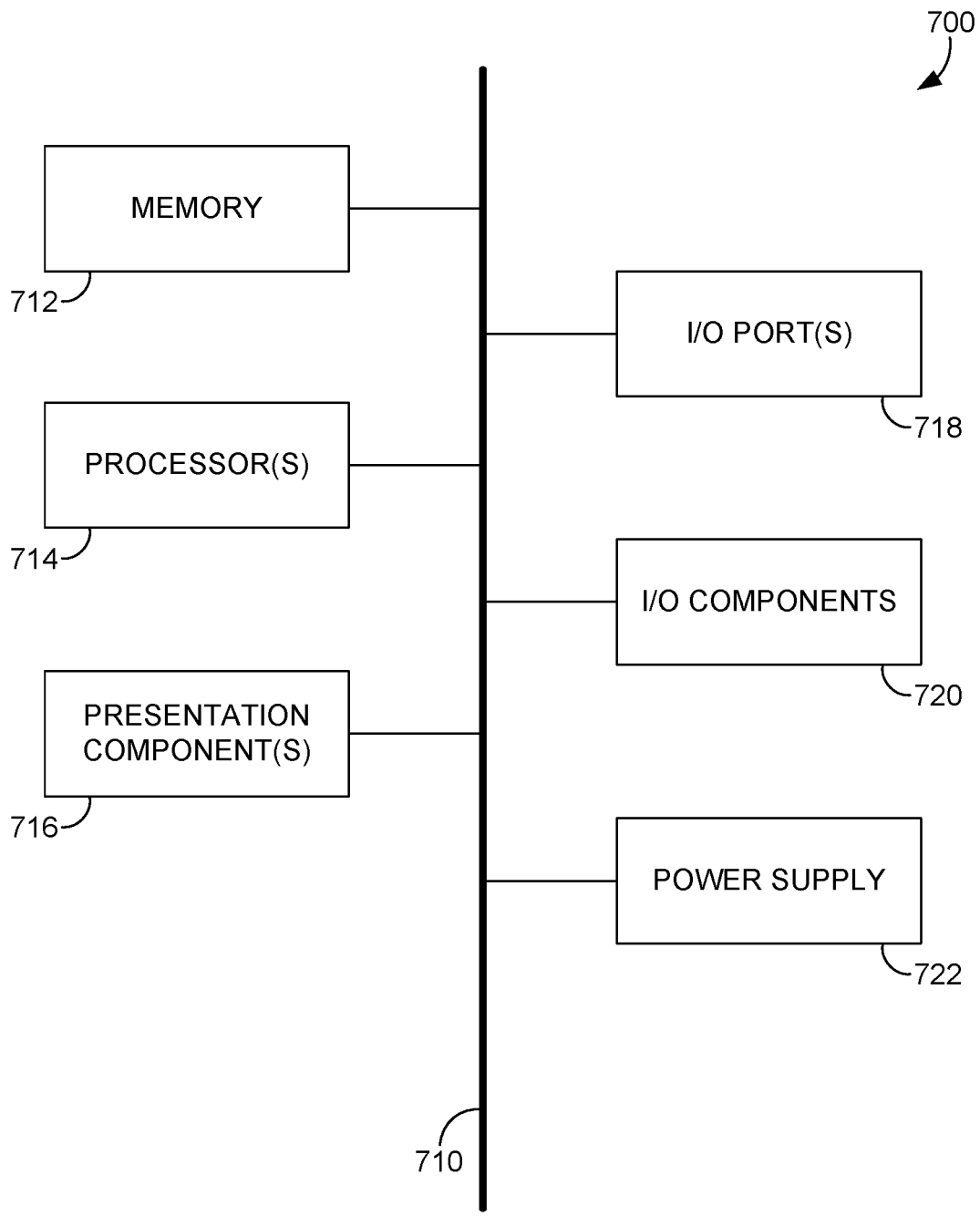
FIG. 7 is a block diagram of an example computing environment suitable for use in implementing aspects of the technology described herein.

Having briefly described an overview of embodiments of the present invention, an example operating environment in which embodiments of the present invention may be implemented is described below in order to provide a general context for various aspects of the present invention. Referring initially to FIG. 7 in particular, an example operating environment for implementing embodiments of the present invention is shown and designated generally as computing device 700. Computing device 700 is but one example of a suitable computing environment and is not intended to suggest any limitation as to the scope of use or functionality of the invention. Neither should computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 7, computing device 700 includes bus 710 that directly or indirectly couples the following devices: memory 712, one or more processors 714, one or more presentation components 716, input/output ports 718, input/output components 720, and illustrative power supply 722. Bus 710 represents what may be one or more buses (such as an address bus, data bus, or combination thereof). The various blocks of FIG. 7 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 7 is merely illustrative of an example computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc.

With reference to the technical solution environment described herein, embodiments described herein support the technical solution described herein. The components of the technical solution environment can be integrated components that include a hardware architecture and a software framework that support constraint computing and/or constraint querying functionality within a technical solution system. The hardware architecture refers to physical components and interrelationships thereof, and the software framework refers to software providing functionality that can be implemented with hardware embodied on a device.

The end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the system components can manage resources and provide services for system functionality. Any other variations and combinations thereof are contemplated with embodiments of the present invention.

By way of example, the technical solution system can include an API library that includes specifications for routines, data structures, object classes, and variables may support the interaction between the hardware architecture of the device and the software framework of the technical solution system. These APIs include configuration specifications for the technical solution system such that the different components therein can communicate with each other in the technical solution system, as described herein.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computerized system comprising:
   one or more computer processors; and
   one or more computer-storage media storing computer-useable instructions that, when used by the one or more computer processors, cause the one or more computer processors to perform operations comprising:
   accessing a plurality of communications, wherein the plurality of communications include information about a primary item;
   accessing a supplementary item information model, wherein the supplementary item information model is trained with a supplementation engine to support extracting each of operational compatibility features, sub-feature compatibility features, demographic-based compatibility features associated with corresponding user element interface elements that include a compatible item interface element, a sub-feature interface element, and an age-range interface element,
   wherein supplementary item information model is trained based on:
   accessing training data comprising a plurality of communications of an item listing platform;
   identifying one or more neural network algorithms for training the supplementary item information model, wherein the one or more neural network algorithms train supplementary item information model operations comprising:
   (1) identifying question features and answer features;
   (2) determining a threshold number of question features and corresponding answer features to identify communications-based compatibility features;
   (3) comparing question features and answer features to identify the communications-based compatibility features, wherein comparing the question features and the answer features is based on a comparison logic of a comparison logic neural network model that generates a similarity score between question features and answer features; and (4) based on similarity scores associated with the comparison logic, identifying the communications-based compatibility features as any of the following: operational compatibility features, sub-feature compatibility features, and demographic-based compatibility features; and using the one or more neural network algorithms, training the supplemental item information model to determine the communications-based compatibility features for items that are not provided in standard features in feature sets of the items;

based on the plurality of communications and the supplementary item information model, generating supplementary item information, wherein the supplementary item information comprises a communications-based compatibility feature associated with the primary item, wherein the communications-based compatibility feature is not a standard feature in a feature set of the primary item, wherein a standard feature is a manufacturer-identified feature; and providing the supplementary item information generated from the plurality of communications to cause presentation of a user interface element corresponding to the communications-based compatibility feature, wherein causing presentation of the user interface element comprises presenting the user interface element proximate to one or more standard features in the feature set of the primary item, the user interface element and the one or more standard features are selectable to execute a search.

2. The system of claim 1, wherein the plurality of communications include questions, answers, and descriptions provided via user interfaces associated with an item listing platform, wherein the item listing platform provides interfaces for presenting user interface elements corresponding to the communications-based compatibility features.

3. The system of claim 1, wherein the communications-based compatibility feature is an operational compatibility feature that indicates that the primary item is compatible with a secondary item.

4. The system of claim 1, wherein the communications-based compatibility feature is a demographic-based compatibility feature that indicates a derived demographic value associated with the primary item.

5. The system of claim 1, wherein the communications-based compatibility feature is a sub-feature compatibility feature that indicates a sub-feature of the primary item, wherein the sub-feature is configured to be listed as a feature of the feature set of the primary item.

6. The system of claim 1, wherein generating the supplementary item information is based on determining that one or more communications in the plurality of communications indicates one or more of the following: an operational compatibility feature, a demographic-based compatibility feature, or a sub-feature compatibility feature based on a supplementary item information model that supports:

identifying question features from the plurality of communications;
identifying answer features from the plurality of communications; and
determining that a threshold number of question features and corresponding answer features identify the communications-based compatibility feature.

7. The system of claim 1, wherein causing presentation of the user interface element comprises presenting the user interface element proximate to one or more standard features in the feature set of the primary item, wherein the user interface element explicitly identifies a category associated with the supplementary item information.

8. One or more computer-storage media having computer-executable instructions embodied thereon that, when executed by a computing system having a processor and memory, cause the processor to:

access a plurality of communications, wherein the plurality of communications include information about a primary item;
communicate the plurality of communications to cause generation of supplementary item information based on the plurality of communications and a supplementary item information model, wherein the supplementary item information comprises a communications-based compatibility feature associated with the primary item, wherein the communications-based compatibility feature is not a standard feature in a feature set of the primary item, wherein a standard feature is a manufacturer-identified feature, wherein the supplementary item information model is trained with a supplementation engine to support extracting each of operational compatibility features, sub-feature compatibility features, demographic-based compatibility features associated with corresponding user element interface elements that include a compatible item interface element, a sub-feature interface element, and an age-range interface element, wherein supplementary item information model is trained based on:
accessing training data comprising a plurality of communications of an item listing platform;
identifying one or more neural network algorithms for training the supplementary item information model, wherein the one or more neural network algorithms enable supplementary item information model operations comprising:

(1) identifying question features and answer features;
(2) determining a threshold number of question features and corresponding answer features to identify communications-based compatibility features;
(3) comparing question features and answer features to identify the communications-based compatibility features, wherein comparing the question features and the answer features is based on a comparison logic of a comparison logic neural network model that generates a similarity score between question features and answer features; and
(4) based on similarity scores associated with the comparison logic, identifying the communications-based compatibility features as any of the following: operational compatibility features, sub-feature compatibility features, and demographic-based compatibility features; and using the one or more neural network algorithms, training the supplemental item information model to determine the communications-based compatibility features for items that are not provided in standard features in feature sets of the items;

receive the supplementary item information generated from the plurality of communications; and based on receiving the supplementary item information, cause presentation of a user interface element corresponding to the communications-based compatibility feature.

9. The media of claim 8, wherein the plurality of communications include questions, answers, and descriptions provided via user interfaces associated with an item listing platform, wherein the item listing platform provides interfaces for presenting user interface elements corresponding to the communications-based compatibility features.

10. The media of claim 8, wherein the communications-based compatibility feature is an operational compatibility feature that indicates that the primary item is compatible with a secondary item.

11. The media of claim 8, wherein the communications-based compatibility feature is a demographic-based compatibility feature that indicates a derived demographic value associated with the primary item.

12. The media of claim 8, wherein the communications-based compatibility feature is a sub-feature compatibility feature that indicates a sub-feature of the primary item, wherein the sub-feature is configured to be listed as a feature of the feature set of the primary item.

13. The media of claim 8, wherein the supplementary item information is generated based on a determination that one or more communications in the plurality of communications indicates one or more of the following: an operational compatibility feature, a demographic-based compatibility feature, or a sub-feature compatibility feature based on a supplementary item information model that supports:

identifying question features from the plurality of communications;

identifying answer features from the plurality of communications; and determining that a threshold number of question features and corresponding answer features identify the communications-based compatibility feature.

14. The media of claim 8, wherein causing presentation of the user interface element comprises presenting the user interface element proximate to one or more standard features in the feature set of the primary item, wherein the user interface element explicitly identifies a category associated with the supplementary item information.

15. A computer-implemented, the method comprising:

accessing a plurality of communications, wherein the plurality of communications include information about a primary item;

accessing a supplementary item information model, wherein the supplementary item information model is trained with a supplementation engine to support extracting each of operational compatibility features, sub-feature compatibility features, demographic-based compatibility features associated with corresponding user element interface elements that include a compatible item interface element, a sub-feature interface element, and an age-range interface element, wherein supplementary item information model is trained based on:

accessing training data comprising a plurality of communications of an item listing platform;

identifying one or more neural network algorithms for training the supplementary item information model, wherein the one or more neural network algorithms enable supplementary item information model operations comprising:

(1) identifying question features and answer features;

(2) determining a threshold number of question features and corresponding answer features to identify communications-based compatibility features;

(3) comparing question features and answer features to identify the communications-based compatibility features, wherein comparing the question features and the answer features is based on a comparison logic of a comparison logic neural network model that generates a similarity score between question features and answer features; and (4) based on similarity scores associated with the comparison logic, identifying the communications-based compatibility features as any of the following: operational compatibility features, sub-feature compatibility features, and demographic-based compatibility features; and using the one or more neural network algorithms, training the supplemental item information model to determine the communications-based compatibility features for items that are not provided in standard features in feature sets of the items;

based on the plurality of communications and the supplementary item information model, generating supplementary item information, wherein the supplementary item information comprises a communications-based compatibility feature associated with the primary item, wherein the communications-based compatibility feature is not a standard feature in a feature set of the primary item, wherein a standard feature is a manufacturer-identified feature; and providing the supplementary item information generated from the plurality of communications to cause presentation of a user interface element corresponding to the communications-based compatibility feature, wherein causing presentation of the user interface element comprises presenting the user interface element proximate to one or more standard features in the feature set of the primary item, the user interface element and the one or more standard features are selectable to execute a search.

16. The method of claim 15, wherein the communications-based compatibility feature is an operational compatibility feature that indicates that the primary item is compatible with a secondary item.

17. The method of claim 15, wherein the communications-based compatibility feature is a demographic-based compatibility feature that indicates a derived demographic value associated with the primary item.

18. The method of claim 15, wherein the communications-based compatibility feature is a sub-feature compatibility feature that indicates a sub-feature of the primary item, wherein the sub-feature is configured to be listed as a feature of the feature set of the primary item.

19. The method of claim 15, wherein generating the supplementary item information is based on determining that one or more communications in the plurality of communications indicates one or more of the following an operational compatibility feature, a demographic-based compatibility feature, or a sub-feature compatibility feature based on a supplementary item information model that supports:
- identifying question features from the plurality of communications;
- identifying answer features from the plurality of communications; and
- determining that a threshold number of question features and corresponding answer features identify the communications-based compatibility feature.

20. The method of claim 19, wherein causing presentation of the user interface element comprises presenting the user interface element as a frequency distribution based on the communications-based compatibility feature being a demographic-based compatibility feature that indicates a derived demographic value associated with the primary item.

* * * * *